United States Patent
Ahmed

(10) Patent No.: US 8,214,417 B2
(45) Date of Patent: Jul. 3, 2012

(54) SUBNORMAL NUMBER HANDLING IN FLOATING POINT ADDER WITHOUT DETECTION OF SUBNORMAL NUMBERS BEFORE EXPONENT SUBTRACTION

(75) Inventor: Sadar U. Ahmed, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 993 days.

(21) Appl. No.: 12/191,526

(22) Filed: Aug. 14, 2008

(65) Prior Publication Data
US 2010/0042665 A1    Feb. 18, 2010

(51) Int. Cl.
*G06F 7/42* (2006.01)
(52) U.S. Cl. ........................................ 708/505
(58) Field of Classification Search .............. 708/505
See application file for complete search history.

(56) References Cited

U.S. PATENT DOCUMENTS

| | | | |
|---|---|---|---|
| 5,432,727 A | 7/1995 | Ahmed | |
| 5,684,729 A * | 11/1997 | Yamada et al. | 708/505 |
| 5,808,926 A * | 9/1998 | Gorshtein et al. | 708/505 |
| 6,094,668 A * | 7/2000 | Oberman | 708/505 |
| 6,301,594 B1 | 10/2001 | Ahmed | |
| 6,990,505 B2 | 1/2006 | Ahmed | |
| 7,552,165 B2 * | 6/2009 | Purcell | 708/505 |

* cited by examiner

*Primary Examiner* — Chuong D Ngo

(74) *Attorney, Agent, or Firm* — Lawrence J. Merkel; Meyertons, Hood, Kivlin, Kowert & Goetzel, P.C.

(57) ABSTRACT

In an embodiment, a floating point unit (FPU) comprises an adder configured to add a first mantissa and a second mantissa and an operand adjust unit coupled to provide at least the first mantissa to the adder. The operand adjust unit is coupled to receive a first operand and a second operand for a floating point add operation, and is configured to: right shift at least one mantissa corresponding to one of the first and second operands responsive to a shift count generated from exponent portions of the first and second operands; to detect whether or not neither, one, or both of the first and second operands are subnormal numbers in parallel with at least a portion of the right shifting; and to left shift by one bit the right shifted mantissa responsive to only one of the first and second operands being a subnormal floating point number.

16 Claims, 3 Drawing Sheets

SUBNORMAL NUMBER HANDLING IN FLOATING POINT ADDER WITHOUT DETECTION OF SUBNORMAL NUMBERS BEFORE EXPONENT SUBTRACTION

BACKGROUND

1. Field of the Invention

This invention is related to floating point units in processors and, more particularly, to handling subnormal numbers in floating point addition/subtraction operations.

2. Description of the Related Art

Floating point units providing hardware support for floating point computations are common in modern microprocessors. Usually, a floating point value is represented and manipulated as described in Institute for Electrical and Electronic Engineers (IEEE) standard 754 and related standards, although non-standard implementations of floating point units are used in some processors. While different precisions for floating point values are permitted, generally the representation comprises a sign bit, an exponent field, and a mantissa field (called the significand field in IEEE 754 standard implementations). The sign bit indicates whether or not the value is positive or negative (e.g. 0 is positive, 1 is negative). The exponent field indicates the power to which the base is raised to be multiplied by the mantissa of the value. In IEEE standard floating point arithmetic, the base is two. In IEEE standard floating point arithmetic, the exponent is biased by adding a constant value to the actual exponent to arrive at the exponent value stored in the exponent field. In this manner, the exponent is always a positive number, even though the exponents range from a negative number to a positive number. The lowest (negative) exponent and highest (positive) exponent depend on the precision. The lowest negative exponent typically has an absolute value that is one less than the highest positive exponent. The mantissa field comprises the mantissa portion of the value, excluding the implicit bit. The implicit bit is the most significant bit of the mantissa, the bit to the left of the binary point (i.e. the implicit bit is not explicitly included in the format, although a given implementation may explicitly store the implicit bit in the internal format used in that implementation's registers). For normal floating point numbers (those having exponents within the exponent range supported by the precision of the value), the implicit bit is a binary one. That is, the mantissa has a value is in the range between 1 (inclusive) and the base (exclusive). For subnormal floating point numbers (those having an exponent smaller than the smallest negative exponent in the range), the implicit bit is a binary zero. That is, the mantissa has a value between 0 (exclusive) and 1 (exclusive). The biased exponent value of zero is used to signify a subnormal floating point number (also referred to as a denormal floating point number). That is, the biased exponent value of zero is a signal, and is not the actual value of the exponent. The actual value of the exponent is the biased value of one, with an implicit bit of zero.

To perform floating point addition, the exponents of the two values to be added must be the same. Typically, the mantissa (including the implicit bit) of the value having the smaller exponent is right shifted by the number of bits equal to the difference in the exponents, effectively representing the mantissa at the higher exponent. Subnormal numbers are detected first, and then shift counts are generated.

SUMMARY

In an embodiment, a floating point unit (FPU) comprises an adder configured to add a first mantissa and a second mantissa, and an operand adjust unit coupled to provide at least the first mantissa to the adder. The operand adjust unit is further coupled to receive a first operand and a second operand for a floating point add operation, and is configured to right shift at least one mantissa corresponding to one of the first and second operands responsive to a shift count generated from exponent portions of the first and second operands. The operand adjust unit is configured to detect whether neither, one, or both of the first and second operands are subnormal numbers in parallel with at least the shift count generation, and to generate the first mantissa by left shifting, by one bit, a shifted mantissa resulting from the right shift. The left shift is responsive to only one of the first and second operands being a subnormal floating point number, but not both.

In one embodiment, a method comprises: generating a first shift count corresponding to a first operand of a floating point add operation; right shifting at least a mantissa portion corresponding to the first operand responsive to the first shift count; in parallel with at least the generating of the first shift count, determining that the first operand is a subnormal floating point number and a second operand is not a subnormal floating point number; left shifting, by one bit, a shifted mantissa resulting from the right shifting of the mantissa corresponding to the first operand responsive to determining that the first operand is the subnormal floating point number and the second operand is not the subnormal floating point number, the left shifting producing a first mantissa; adding the first mantissa and a second mantissa corresponding to the second operand to produce a sum; normalizing and rounding the sum to produce a floating point result; and writing the floating point result to a floating register file in a processor.

In an embodiment, an apparatus comprises a right shifter coupled to receive a first operand and a second operand of a floating point add operand, the right shifter configured to right shift a mantissa corresponding to one of the first operation and the second operand to generate a shifted mantissa. The right shift is performed responsive to a shift count generated from an exponent of the first operand and an exponent of the second operand. The apparatus further comprises a subnormal detect unit coupled to receive the first operand and the second operand, and configured to detect whether or not neither, one, or both of the first operand and the second operand are subnormal floating point numbers. The apparatus further comprises a left shifter configured to left shift the shifted mantissa by one bit responsive to only one of the first operand and the second operand being subnormal floating point numbers, the left shifter generating a resulting mantissa.

BRIEF DESCRIPTION OF THE DRAWINGS

The following detailed description makes reference to the accompanying drawings, which are now briefly described.

Figure 1:
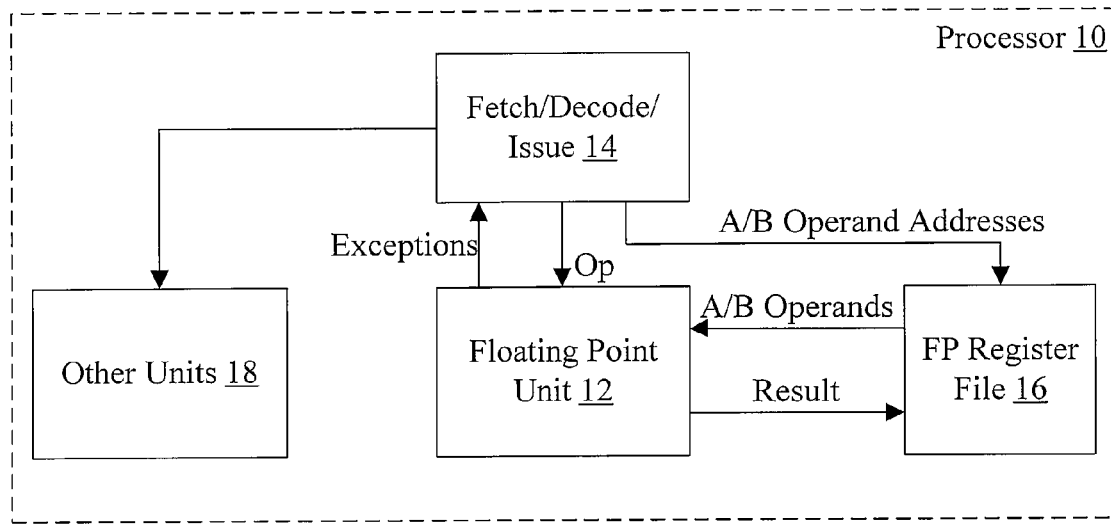
FIG. 1 is a block diagram of one embodiment of a processor including a floating point unit (FPU).

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram is shown illustrating one embodiment of a processor 10 including a floating point unit (FPU) 12. The processor 10 further includes a fetch/decode/issue unit 14, a floating point (FP) register file 16, and one or more other execution units 18. The fetch/decode/issue unit 14 is coupled to the FPU 12, the FP register file 16, and the other execution units 18. The FPU 12 is further coupled to the FP register file 16.

The FPU 12 comprises hardware configured to perform floating point arithmetic. The amount of hardware support may vary from embodiment to embodiment, with any operations that cannot be computed by the hardware causing an exception (or trap) to software to emulate the operation (or to handle an error if the operation cannot be completed). For example, in one embodiment, the FPU 12 may signal an unfinished trap to the fetch/decode/issue unit 14 if the operation cannot be completed in the FPU 12 hardware. There may be other exceptions that the FPU 12 may report as well, such as various arithmetic exceptions defined by the IEEE standard floating point arithmetic, implementation-specific exceptions, etc. The signalling of various traps/exceptions is illustrated as the exceptions signal in FIG. 1 to the fetch/decode/issue unit 14. The signalling of a trap/exception (if the trap/exception is enabled, in some cases) causes the fetch/decode/issue unit 14 to cease fetching instructions in the current execution path and to fetch instructions from a specified address at which an exception handling routine is stored. In one embodiment, the FPU 12 may be an IEEE 754 standard implementation (and related standards, in some embodiments). Other embodiments may be non-standard implementations.

Floating point operands are stored in the floating point register file 16. The fetch/decode/issue unit 14 may issue a floating point operation to the FPU 12 for execution, and may transmit the operand addresses for the operands to the FP register file 16 ("A/B Operand Addresses" in FIG. 1). While FIG. 1 illustrates two operands A and B for floating point add operations, other embodiments may include more operands for a given operation (e.g. the fused multiply-add instruction in some instruction sets includes three operands). The FP register file 16 may transmit corresponding A and B operands from the registers addressed by the A and B operand addresses to the FPU 12 ("A/B Operands" in FIG. 1). In other embodiments, the fetch/decode/issue unit 14 may transmit the operand addresses to the FPU 12 with the operation, and the FPU 12 may read the operands from the register file 16. The floating point unit 12 is further configured to write a floating point result ("Result" in FIG. 1) to the FP register file 16. The result communication may include a floating point value and a register address of the register to which the value is to be written. Other embodiments may include an FPU 12 that returns the result to a speculative storage such as a reorder buffer, which may write the result to the FP register file 16 when the corresponding instruction is successfully retired.

In one embodiment, the FPU 12 is configured to perform floating point add operations, including handling subnormal floating point numbers (more briefly "subnormal numbers", or "subnormals" herein) without signalling an unfinished trap and in a fashion that reduces the critical timing paths in the circuitry for performing the execution. As used herein, a floating point add operation includes both floating point add and floating point subtract arithmetic operations. Additionally, in some embodiments, the floating point add operation may also include the add portion of a fused multiply-add operation. Thus, if a multiply/add unit is included, the add portion of the multiply/add unit may implement the subnormal handling described herein. Specifically, the FPU 12 includes an operand adjust unit that performs at least a portion of the shift of the mantissa of the operand having the smaller exponent in parallel with detecting subnormal operands. As mentioned previously, the mantissa of the smaller operand is right shifted by the difference in the exponents of the operands in order to add the shifted mantissa to the mantissa of the other operand.

The FPU 12 may generate the shift counts using the biased exponents from the exponent fields of the A and B operands. If both operands are normal floating point numbers (more briefly "normal numbers", or "normals", herein), or if both operands are subnormal numbers, the shift counts thus generated are correct. However, in only one of the A and B operands is subnormal, then the shift count is off by one. That is, the subnormal mantissa is shifted one bit too far to the right (because the exponent field of the subnormal number is 0, and the correct biased exponent is actually 1). The FPU 12 may detect that only one operand is subnormal, and correct the shift by left shifting the right-shifted mantissa by one. In the case that there is only one subnormal number, than it is known that the shifted mantissa corresponds to the subnormal number, since it is smaller than the normal number. Since the subnormal detection is performed in parallel with shift count generation, the critical path may be shortened and the timing considerations in the FPU 12 may be lessened.

The other units 18 may include any other desired execution units (e.g. integer execution units, multimedia execution units, load/store units, etc.). The other units 18 may also include register files for the operands used by the other units, in one embodiment.

The fetch/decode/issue unit 14 may generally be configured to fetch instructions from memory (and/or an instruction cache, if included), decode the instructions to determine which execution units will execute the instructions, and issue the instructions for execution. Various embodiments may implement in order execution or out of order execution, speculative execution, etc. Any configuration may be supported (e.g. a centralized scheduler that issues ready instructions for execution, a reorder buffer implementation with reservation stations at the execution units, a simple instruction queue, etc.). In some embodiments, the processor 10 may include hardware support for multithreaded execution and the fetch/decode/issue unit 14 may manage fetching and issuing from the multiple threads.

Figure 2:
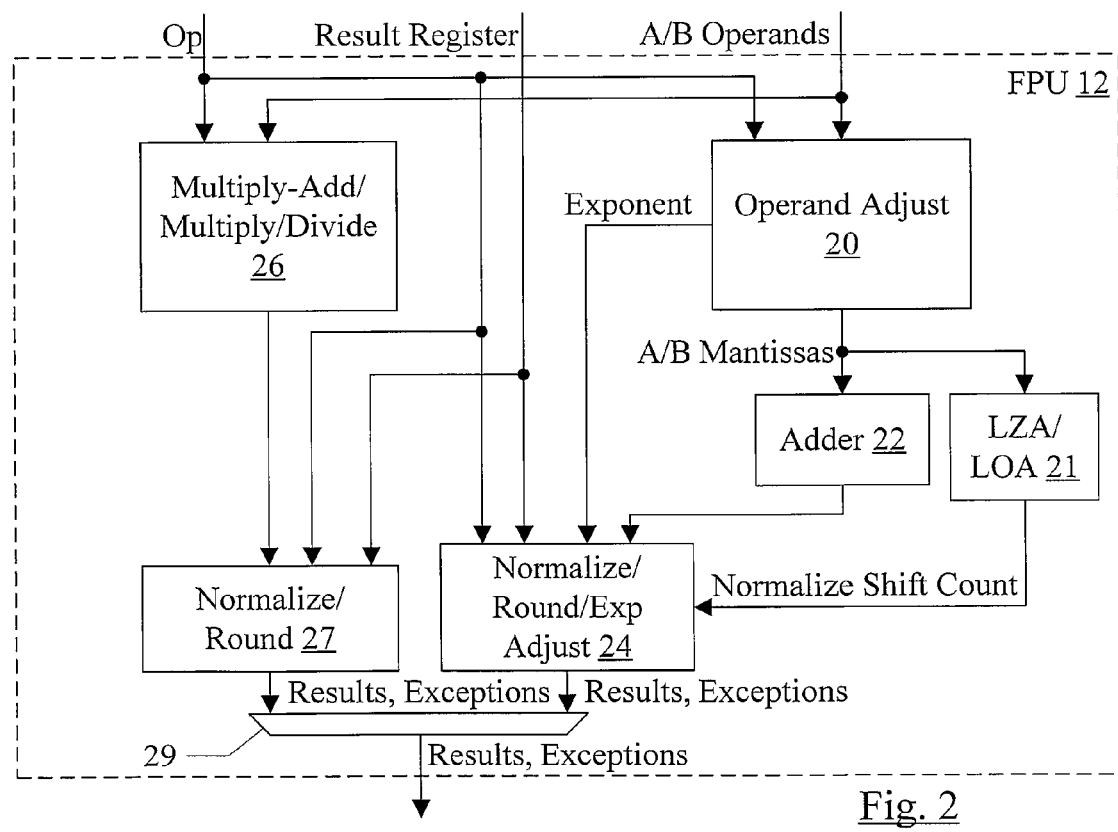
FIG. 2 is a block diagram of one embodiment of the FPU shown in more detail.

Turning now to FIG. 2, a block diagram of one embodiment of the FPU 12 is shown in greater detail. As illustrated in FIG. 2, the FPU 12 includes an operand adjust unit 20, an adder 22, a leading zero anticipator/leading one anticipator (LZA/LOA) unit 21, a normalize/round unit/exponent adjust unit 24, a multiply-add/multiply/divide unit 26, and a normalize/round unit 27. Other embodiments may include additional units in the FPU 12, as desired. The multiply-add/multiply/divide unit 26 and the operand adjust unit 20 are coupled to receive the A and B operands from the FP register file 16 and the operation from the fetch/decode/issue unit 14. The normalize/round unit/exponent adjust unit 24 and the normalize/round unit 27 are further coupled to receive a result register address from the fetch/decode/issue unit 14 as well as an indication of the operation (Op) from the fetch/decode/issue unit 14. The normalize/round/exponent adjust unit 24 is still further coupled to receive result from the adder 22. The normalize/round/exponent adjust unit 24 is further coupled to receive a normalize shift count from the LZA/LOA unit 21. The normalize/round unit 24 is still further coupled to receive an exponent from the operand adjust unit 20, and is coupled to provide the results and exceptions of the operation to a multiplexor (mux) 29. Both the adder 22 and the LZA/LOA unit 21 are coupled to receive the mantissas of the A and B operands form the operand adjust unit 20. The normalize/round unit 27 is coupled to receive the results from the multiply-add/multiply/divide unit 27, and is configured to provide results and exceptions to the mux 29. The mux 29 is configured to select the results and exceptions from one of the units 24 and 27 dependent on the type of operation being executed, and the output of the mux 29 is the results transmitted to the FP register file 16 and the exceptions transmitted to the fetch/decode/issue unit 14. For example, either the unit 24 or the unit 27 may control the mux 29, based on the Op indicated by the fetch/decode/issue unit 14.

In the case of a floating point add operation from the fetch/decode/issue unit 14, the operand adjust unit 20 is configured to right shift the mantissa of the smaller operand and provide the mantissas to the adder 22. That is, one of the A/B mantissas supplied to the adder 22 has been shifted, and the other is unshifted, based on the exponents of the A and B operands. The operand adjust unit 20 may also provide an inverted mantissa for one operand if a subtraction is effectively specified (e.g. because the operand is negative, or because the operation is subtract and the B operand is positive). The adder 22 may add the supplied mantissas and provide the result to the normalize/round/exponent adjust unit 24. The operand adjust unit 20 may also provide the exponent of the larger operand to the normalize/round/exponent adjust unit 24. The LZA/LOA unit 21 may anticipate the leading zeros and/or leading ones in the result, and may generate a (left) shift count for the normalize/round/exponent adjust unit 24. Any LZA/LOA algorithm may be used. The normalize/round/exponent adjust unit 24 may normalize and round the result according to the rounding mode in effect for the FPU 12, and may transmit the normalized, rounded result and any detected exceptions. Additionally, the normalize/round/exponent adjust unit 24 may adjust the exponent of the normalized result. The exceptions may be detected by the normalize/round/exponent adjust unit 24, or other units within the FPU 12 which communicate the exceptions to the normalize/round/exponent adjust unit 24 with the results.

In the case of a multiply or divide operation (or a fused multiply-add operation), the multiply-add/multiply/divide unit 26 may receive the operands and provide the result (and any exceptions) to the normalize/round unit 27. The normalize/round unit 27 may normalize and round the result, and transmit the result and any exceptions.

It is noted that, in some embodiments, a large exponent difference (LED)/small exponent different (SED) parallel adder implementation may be used. A small exponent difference may be defined as the absolute value of the difference in the exponents being less than or equal to one (i.e. zero or one) and the operation is an effective subtraction. The SED path may be used when an SED is detected, and the LED path may be used otherwise. The SED path may eliminate the potentially large right shift that may be needed in the LED path, and thus may be faster. The subnormal handling described herein may be implemented on the LED path. Additionally, in some embodiments, the multiply-add/multiply/divide unit 26 and the operand adjust unit 20/adder 22 may be separate, independent pipelines in the FPU 12.

Figure 3:
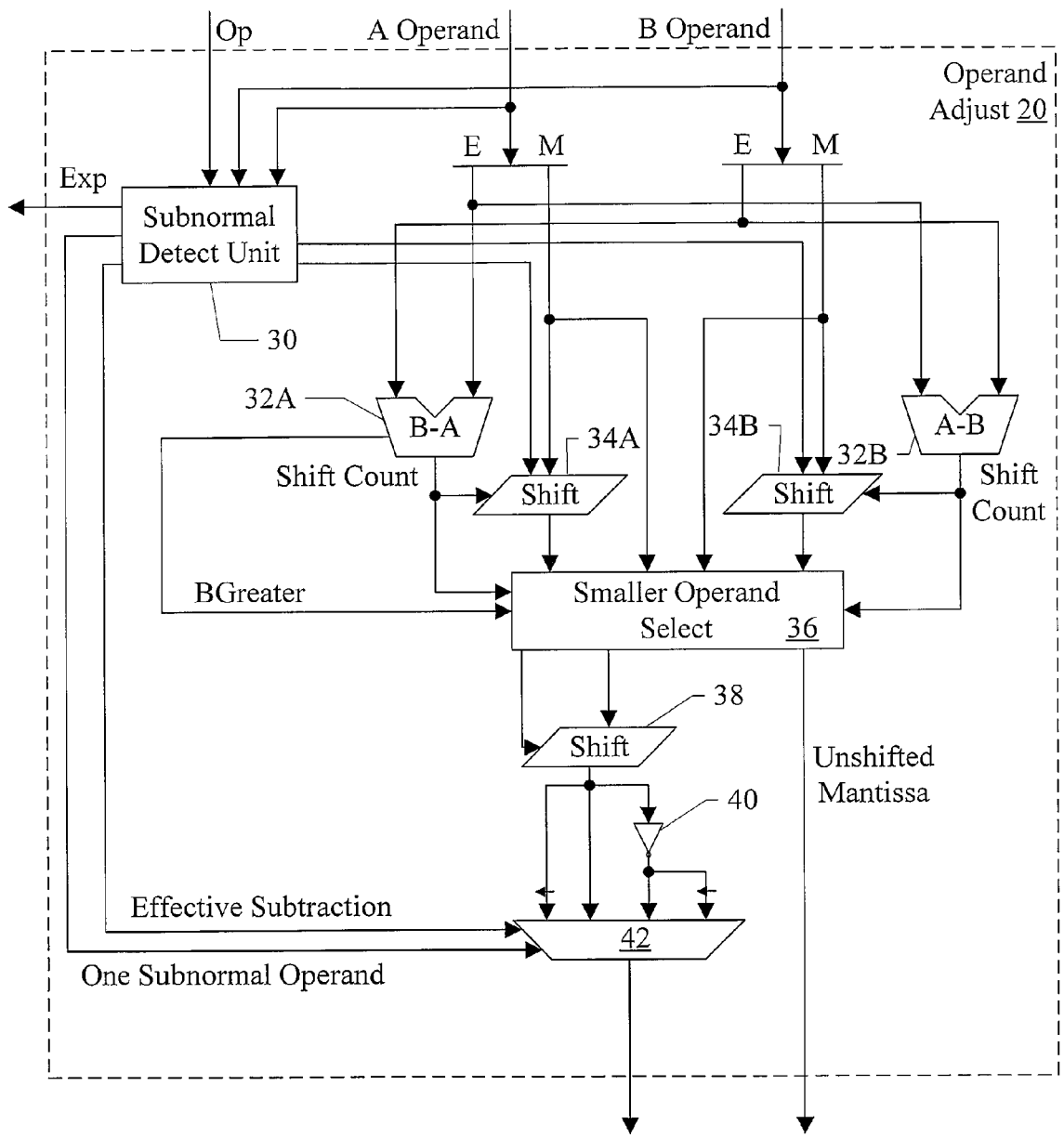
FIG. 3 is a block diagram of one embodiment of an operand adjust unit.

Turning next to FIG. 3, a block diagram of one embodiment of the operand adjust unit 20 is shown. In the illustrated embodiment, the operand adjust unit 20 includes a subnormal detect unit 30, shift count generators 32A-32B, initial right shifters 34A-34B, smaller operand select unit 36, remaining right shifter 38, inverter 40, and output mux 42. Together, the shift count generators 32A-32B, the initial right shifters 34A-34B, the smaller operand select unit 36, and the remaining right shifter 38 may comprise a right shifter configured to right shift the mantissa of one of the A and B operands that has the smaller exponent. The output mux 42, coupled as shown and described below, may comprise a left shifter. The subnormal detect unit 30 is coupled to provide the exponent to the normalize/round unit 24, to provide the implicit bit of the mantissas to the initial right shifters 34A-34B, and to provide selection controls to the output mux 42. The subnormal detect unit 30 is coupled to receive the operation from the fetch/decode/issue unit 14 and the A and B operands. The shift count generators 32A-32B are coupled to receive the exponent portions of the A and B operands (labeled "E" in FIG. 3, split from the mantissa field marked "M" in FIG. 3) and to provide a shift count to the respective initial right shifters 34A-34B and the smaller operand select unit 36. The initial right shifters 34A-34B are coupled to receive the mantissa portions of the respective A and B operands (including the implicit bits, as mentioned previously) and to provide partially shifted values to the smaller operand select unit 36. It is noted that the implicit bits may be available to the initial right shifters 34A-34B prior to the shift counts generated by the shift count generators 32A-32B. The smaller operand select unit 36 is further coupled to receive the mantissa portions of the A and B operands and a B greater (BGreater) output from the shift count generator 32A, and to provide a shift count and input value to the remaining right shifter 38. The smaller operand select unit 36 is further configured to transmit an unshifted mantissa to the adder 22. The output of the remaining right shifter 38 is coupled to the output mux 42, and the output left shifted by one bit (indicated by the small left pointing arrow in FIG. 3) is also coupled to the output mux 42. The output of the remaining right shifter 38 is also coupled to the inverter 40, the output of which is coupled to the mux 42 along with the output of the inverter left shifted by one bit (again indicated by the small left pointing arrow in FIG. 3). The output of the output mux 42 is provided to the adder 22.

The subnormal detect unit 30 is configured to determine if neither, one, or both of the operands are subnormal numbers. As mentioned previously, subnormal numbers have a biased exponent value of zero. However, some normal numbers and special numbers also have a biased exponent value of zero (e.g. the encoding for zero has both exponent and mantissa equal to zero). Accordingly, the subnormal detect unit 30 may examine the entire operand value to determine if a number is subnormal. In one embodiment, the subnormal detect unit 30 may examine only the exponents of the operands to predict a subnormal. The prediction is accurate unless the predicted subnormal is actually a zero (mantissa and exponent all zero). Even in the case that the predicted subnormal is actually a zero, the prediction will produce the correct result since a right or left shift of all zeros does not alter the result. The mantissa equal to zero may be detected and combined with the predicted subnormal indication to generate the one subnormal operand signal. Additionally, the subnormal detect unit may detect which exponent is larger, and may transmit the larger exponent to the normalize/round unit 24. If only one of the operands is a subnormal number, the subnormal detect unit 30 may assert the one subnormal operand control signal to the output mux 42. Assertion of this control signal causes one of the left-shifted inputs to the mux 42 to be selected (depending on whether or not the operation is effectively a subtract operation). If both of the operands are subnormal, or neither operand is subnormal, the subnormal detect unit 30 does not assert the one subnormal operand control signal and one of the non-left-shifted inputs to the mux 42 is selected. Additionally, in this embodiment, the subnormal detect unit 30 provides the implicit bit for each mantissa dependent on whether or not the operand is subnormal (implicit bit of zero) or normal (implicit bit of one). In other embodiments, the FP register file 16 may store the implicit bit explicitly, and the subnormal detect unit 30 need not provide it. In such an embodiment, the initial right shift of the mantissas by the initial right shifters 34A-34B may be at least partially overlap with subnormal detection, in addition to the shift count generation overlapping the subnormal detection.

The subnormal detect unit 30 may further determine if the operation is effectively a subtract. An operation may be effectively a subtract if the operation specified by the fetch/decode/issue unit 14 is subtract and the A and B operands have like signs or if the operation specified is add and the A and B operands have opposite signs. The subnormal detect unit 30 may assert the effective subtraction control signal if the operation is an effective subtract, and the output of the inverter 40 (or the left-shifted version thereof) may be selected by the output mux 42. If the operation is not an effective subtract, the output of the remaining right shifter 38 is selected (or the left-shifted version thereof).

In the illustrated embodiment, the right shifter performs a portion of the right shift in parallel on both mantissas, and then completes the right shift of the mantissa for which the corresponding exponent is smaller. Particularly, the shift count generators generate the two possible shift counts: exponent B minus exponent A, which would be the shift count if A is smaller (shift count generator 32A); and exponent A minus exponent B, which would be the shift count if B is smaller (shift count generator 32B). The shift count generators 32A-32B may provide their shift counts to the initial right shifters 34A-34B, respectively. The initial right shifters 34A-34B may perform a portion of the right shift, based on a portion of the shift count (e.g. the least significant bits). Additionally, the shift count generator 32A may produce the B greater (BGreater) signal, indicating when asserted that B is the larger operand. The BGreater signal may be the carry out of the B−A subtraction, indicating when set that the exponent of B is greater than the exponent of A. In some embodiments, the BGreater signal may also bet set if the exponent of B is equal to the exponent of A. If the exponent of B is less than the exponent of A, the BGreater signal is deasserted.

The smaller operand select unit 36 is configured to select the output of the initial right shifter 34A if the BGreater signal is asserted, and to provide that output the remaining right shifter 38 along with the shift count from the shift count generator 32A. Additionally, the smaller operand select unit 36 may select the unshifted B mantissa if the BGreater signal is asserted and output that mantissa as the unshifted mantissa to the adder 22. On the other hand, if the BGreater signal is deasserted, the smaller operand select unit 36 is configured to select the output of the initial right shifter 34B to provide to the remaining right shifter 38, along with the shift count from the shift count generator 32B. Additionally, the smaller operand select unit 36 may select the unshifted A mantissa if the BGreater signal is deasserted, to provide as the unshifted mantissa to the adder 22. The remaining right shifter 38 may complete the right shift of the mantissa corresponding to the smaller exponent.

While the illustrated embodiment performs a portion of the right shift in parallel on both operands, other embodiments may perform the entire right shift in parallel on both operands and select the smaller operand at the end of the parallel right shift. In the illustrated embodiment, because the implicit bit is provided by the subnormal detect unit 30, the portion of the right shift that is performed in parallel with subnormal detection is the shift count generation. Other embodiments, particularly embodiments in which the implicit bit is explicitly stored in the FP register file 16, may also perform some of the initial right shift in parallel. In still other embodiments, the implicit bit may be predicted by the subnormal detect unit 30 based on the exponent of each operand. In such embodiments, the implicit bit may be available before the shift count is calculated and thus a portion of the initial right shift may be performed in parallel with the detection of the one subnormal operand. If the prediction is wrong (i.e. the subnormal operand is actually zero), then the shifted mantissa is accurate since the mantissa is all zeros.

Figure 4:
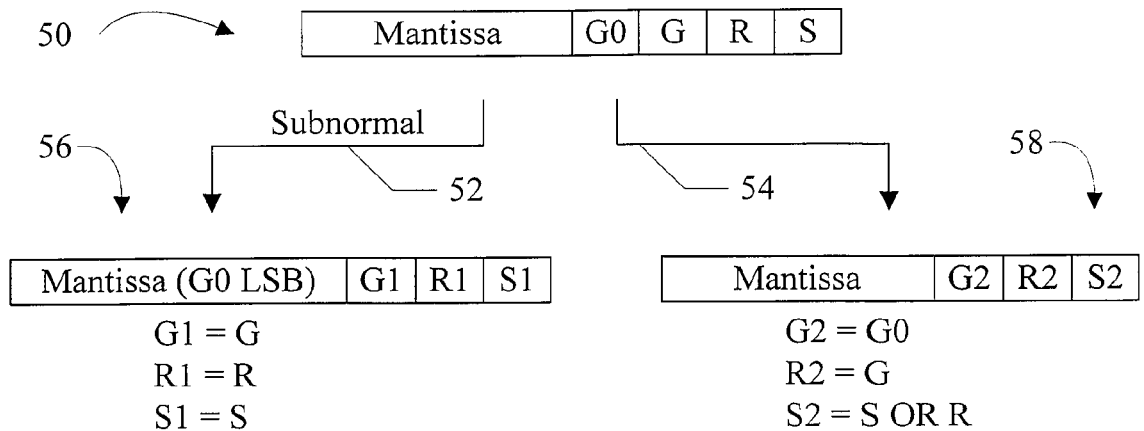
FIG. 4 is a block diagram illustrating guard, round, and sticky bit generation for one embodiment.

Turning next to FIG. 4, a block diagram of one embodiment of the value as output from the remaining right shifter 38 is shown (reference numeral 50), and the resulting shifted mantissas that may be generated based on whether or not one subnormal operand is detected. The value output from the remaining right shifter 38 may include the mantissa bits that result from the shift ("Mantissa"), as well as several additional bits accumulated during the shift (G0, G, R, and S). The G0 bit (a newly added bit in this disclosure that is not found in a typical floating point unit implementation) and G bit are guard bits, the R bit is a round bit, and the S bit is the sticky bit. The G0, G, and R bits are the most recent three bits to have been right shifted out of the least significant bit of the mantissa (in the order shown, that is G0 is the most significant bit that has been right shifted out, G is the next most significant bit shifted out, etc.). The sticky bit is the logical OR of the bits that have been right shifted out of the R bit. Thus, the sticky bit is an indication of whether or not any previous logical one bit has been shifted out.

If only one subnormal operand is detected (arrow 52), the resulting shifted mantissa is as shown at reference numeral 56, with G1, R1, and S1 generated as shown in the equations below the shifted mantissa. The resulting shifted mantissa at reference numeral 56 is left shifted by one bit (and G0 is left shifted in as the least significant bit). The G1, R1, and S1 bits are equal to the G, R, and S bits shown at reference numeral 50. Otherwise (arrow 54), the resulting shifted mantissa is as shown as reference numeral 58 (and is the same as the shifted mantissa at reference numeral 50), with G2, R2, and S2 generated as shown below the shifted mantissa. That is, since the shifted mantissa is not adjusted, the guard bit G2 becomes G0, the round bit R2 becomes the G bit, and the sticky bit S2 becomes the logical OR of the S bit and the R bit.

Figure 5:
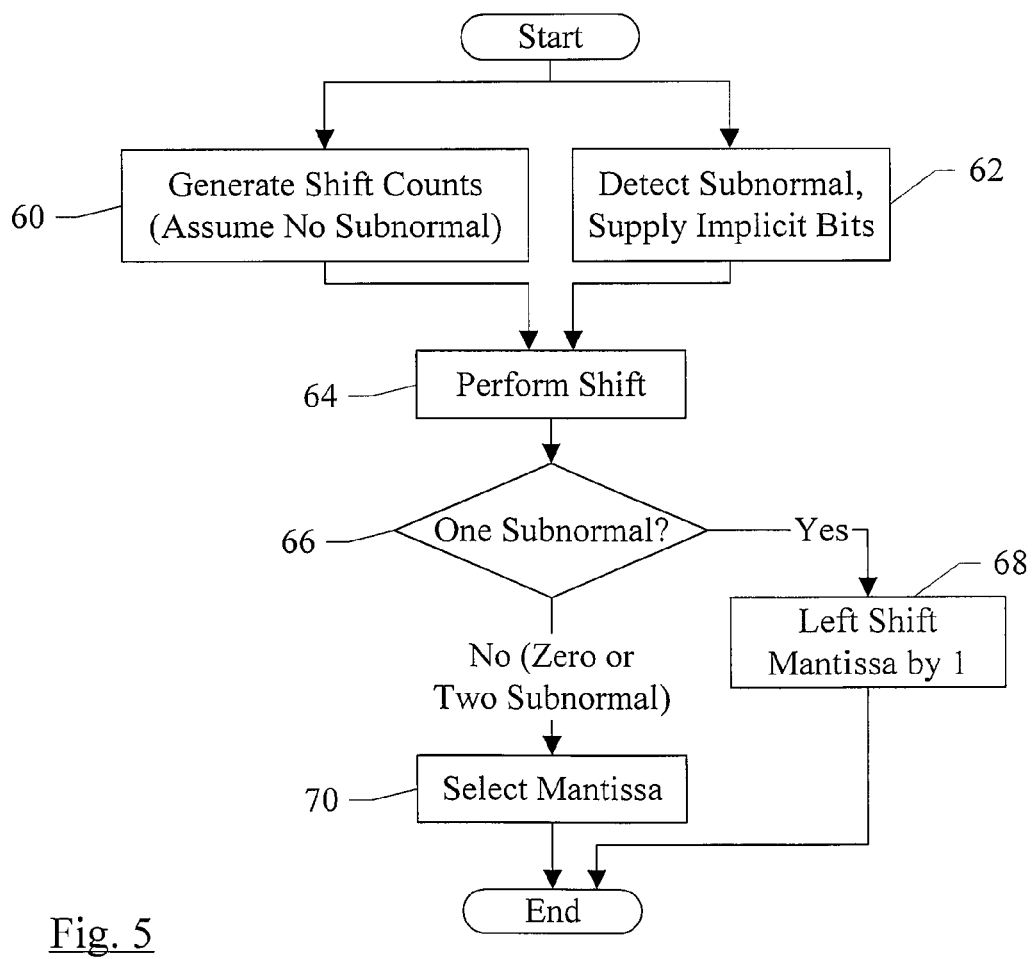
FIG. 5 is a flowchart illustrating operation of one embodiment of the operand adjust unit.

Turning now to FIG. 5, a flowchart is shown illustrating operation of one embodiment of the FPU 12 for a floating point add operation. While the blocks are shown in a particular order for ease of understanding, other orders may be used. Blocks 60 and 62 are explicitly shown in parallel, but other blocks may be performed in parallel as well in some embodiments, in combinatorial logic within the FPU 12. Blocks, combinations of blocks, and/or the flowchart as a whole may be pipelined over multiple clock cycles.

The FPU 12 may generate the shift counts for the operands, assuming that there are no subnormal numbers (e.g. subtracting the exponents without modification) (block 60). In parallel, the FPU 12 may detect whether or not neither, one, or both operands are subnormal (and may generate the implicit bits for each operand) (block 62). As mentioned previously, more of the right shift operation than the shift counts may be performed in parallel with subnormal detection, and the implicit bits may be provided with the operands, in other embodiments.

The FPU 12 may perform the right shift on the mantissa (block 64), possibly performing a portion in parallel on both operands and selecting the operand having the smaller exponent. If only one subnormal is detected (decision block 66, "yes" leg), the FPU 12 may left shift the shifted mantissa by 1 (block 68). Otherwise (zero or two operands are subnormal-decision block 66, "no" leg), the FPU 12 may select the shifted mantissa (no left shift) for the addition (block 70). It is noted that, in the case of both operands being subnormal numbers, no right shift actually occurs. That is, the difference between the exponents is zero and the mantissas output by the operand adjust units 20 are the same as the input mantissas from the A/B operands.

It is noted that the present description periodically refers to various hardware, the FPU, the operand adjust unit, the subnormal detect unit, various shifters, select unit, etc. as being "configured to" implement various features. Generally, such language refers to a broad recitation of structure. The phrase "configured to" in such contexts should be interpreted as "having circuitry" that implements the recited features.

Numerous variations and modifications will become apparent to those skilled in the art once the above disclosure is fully appreciated. It is intended that the following claims be interpreted to embrace all such variations and modifications.

What is claimed is:

1. A floating point unit (FPU) comprising:
    an adder configured to add a first mantissa and a second mantissa; and
    an operand adjust unit coupled to provide at least the first mantissa to the adder, wherein the operand adjust unit is further coupled to receive a first operand and a second operand for a floating point add operation, and wherein the operand adjust unit is configured to right shift at least one mantissa corresponding to one of the first and second operands responsive to a shift count generated from exponent portions of the first and second operands, and wherein the operand adjust unit is configured to detect whether neither, one, or both of the first and second operands are subnormal numbers in parallel with at least the shift count generation, and wherein the operand adjust unit is configured to left shift by one bit a shifted mantissa resulting from the right shifting to generate the first mantissa, wherein the left shift is responsive to only one of the first and second operands being a subnormal floating point number, and wherein the operand adjust unit is configured to generate a first guard bit, a second guard bit, a round bit, and a sticky bit responsive to the right shifting, and wherein the first guard bit is a most significant bit right-shifted out of the shifted mantissa, and wherein the second guard bit is a second most significant bit right-shifted out of the shifted mantissa, and wherein the round bit is a third most significant bit right-shifted out of the mantissa, and the sticky bit is a logical OR of remaining bits right shifted out of the mantissa;
    and wherein the operand adjust unit is configured, responsive to performing the left shift, to generate: the first mantissa including the first guard bit as the least significant bit of the mantissa, a corresponding guard bit equal to the second guard bit, a corresponding round bit equal to the round bit of the shifted mantissa, and a corresponding sticky bit equal to the sticky bit of the shifted mantissa;
    and wherein the operand adjust unit is configured, responsive to not performing the left-shift, to generate: the corresponding guard bit equal to the first guard bit, the corresponding round bit equal to the second guard bit, and the corresponding sticky bit equal to the logical OR of the round bit corresponding to the shifted mantissa and the sticky bit corresponding to the shifted mantissa.

2. The FPU as recited in claim 1 wherein a first exponent corresponding to the first mantissa is smaller than a second exponent corresponding to the second mantissa.

3. The FPU as recited in claim 2 wherein the operand adjust unit is further configured to provide the second mantissa, the second mantissa being an unshifted mantissa corresponding to one of the first and second operands which has the second exponent.

4. The FPU as recited in claim 1 wherein the operand adjust unit is configured not to left shift the shifted mantissa responsive to detecting that both the first operand and the second operand are normal floating point numbers, and wherein the operand adjust unit is configured not to left shift the shifted mantissa responsive to detecting that both the first operand and the second operand are subnormal floating point numbers.

5. The FPU as recited in claim 1 wherein at least a portion of the right shift is performed in parallel on each of the first operand and the second operand.

6. The FPU as recited in claim 5 wherein a shift count for the first operand comprises the exponent of the second operand minus the exponent of the first operand, and wherein the shift count for the second operand comprises the exponent of the first operand minus the exponent of the second operand.

7. The FPU as recited in claim 5 wherein the operand adjust unit is configured to determine which of the first operand and the second operand has a smaller exponent, and is further configured to complete the right shift for the one of the first operand and the second operand that has the smaller exponent to generate the shifted mantissa.

8. The FPU as recited in claim 7 wherein the operand adjust unit is further configured to apply the left shift to the shifted mantissa that results from completing the right shift.

9. The FPU as recited in claim 1 further comprising a leading zero count unit and a normalize and round unit, wherein the adder is configured to provide a sum mantissa generated by the adder from the first mantissa and the second mantissa to the leading zero count unit and the normalize and round unit, and wherein the operand adjust unit is configured to provide a larger exponent of the first operand and the second operand to the normal and round unit, and wherein the normalize and round unit is configured to generate a result value that is the result of the floating point add operation.

10. An apparatus comprising:
    a right shifter coupled to receive a first operand and a second operand of a floating point add operation, the right shifter configured to right shift a mantissa corresponding to one of the first operand and the second operand to generate a shifted mantissa, the right shifter configured to shift by a shift count generated from an exponent of the first operand and an exponent of the second operand, and wherein the right shifter is configured to generate a first guard bit, a second guard bit, a round bit, and a sticky bit responsive to the right shifting, and wherein the first guard bit is a most significant bit right-shifted out of the shifted mantissa, and wherein the second guard bit is a second most significant bit right-shifted out of the shifted mantissa, and wherein the round bit is a third most significant bit right-shifted out of the mantissa, and the sticky bit is a logical OR of remaining bits right shifted out of the mantissa;

a subnormal detect unit coupled to receive the first operand and the second operand, and configured to detect whether neither, one, or both of the first operand and the second operand are subnormal floating point numbers; and a left shifter configured to left shift the shifted mantissa by one bit responsive to only one of the first operand and the second operand being subnormal floating point numbers, the left shifter generating a resulting mantissa, and wherein the left shifter is configured, responsive to performing the left shift, to generate: the first mantissa including the first guard bit as the least significant bit of the mantissa, a corresponding guard bit equal to the second guard bit, a corresponding round bit equal to the round bit of the shifted mantissa, and a corresponding sticky bit equal to the sticky bit of the shifted mantissa; and wherein the left shifter is configured, responsive to not performing the left-shift, to generate: the corresponding guard bit equal to the first guard bit, the corresponding round bit equal to the second guard bit, and the corresponding sticky bit equal to the logical OR of the round bit corresponding to the shifted mantissa and the sticky bit corresponding to the shifted mantissa.

11. The apparatus as recited in claim 10 wherein the left shifter is configured not to left shift the shifted mantissa responsive to detecting that both the first operand and the second operand are subnormal floating point numbers.

12. The apparatus as recited in claim 11 and wherein the left shifter is configured not to left shift the shifted mantissa responsive to detecting that both the first operand and the second operand are normal floating point numbers.

13. The apparatus as recited in claim 10 wherein right shifter is configured to perform at least a portion of the right shift in parallel on each of the first operand and the second operand.

14. The apparatus as recited in claim 10 wherein a shift count for the first operand comprises the exponent of the second operand minus the exponent of the first operand, and wherein the shift count for the second operand comprises the exponent of the first operand minus the exponent of the second operand.

15. The apparatus as recited in claim 13 wherein the right shifter is configured to determine which of the first operand and the second operand has a smaller exponent, and to complete the right shift for the one of the first operand and the second operand that has the smaller exponent to generate the shifted mantissa.

16. The apparatus as recited in claim 15 wherein the left shifter is configured to apply the left shift to the shifted mantissa that results from completing the right shift.

* * * * *

UNITED STATES PATENT AND TRADEMARK OFFICE
CERTIFICATE OF CORRECTION

| | |
|---|---|
| PATENT NO. | : 8,214,417 B2 |
| APPLICATION NO. | : 12/191526 |
| DATED | : July 3, 2012 |
| INVENTOR(S) | : Sadar U. Ahmed |

It is certified that error appears in the above-identified patent and that said Letters Patent is hereby corrected as shown below:

In the Claims:

Claim 14, col. 12, line 11, please delete "claim 10" and insert --claim 13-- in place thereof.

Signed and Sealed this
Fifteenth Day of January, 2013

David J. Kappos
*Director of the United States Patent and Trademark Office*